United States Patent
DeVlieg et al.

(10) Patent No.: US 8,549,968 B2
(45) Date of Patent: Oct. 8, 2013

(54) TOW CUTTING APPARATUS

(75) Inventors: Russell C. DeVlieg, Woodinville, WA (US); Kenneth P. Zaballos, Burien, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/481,717

(22) Filed: May 25, 2012

(65) Prior Publication Data

US 2012/0227560 A1    Sep. 13, 2012

Related U.S. Application Data

(62) Division of application No. 11/204,355, filed on Aug. 16, 2005, now Pat. No. 8,205,532.

(51) Int. Cl.
*B26D 1/00* (2006.01)

(52) U.S. Cl.
USPC .......................................................... 83/157

(58) Field of Classification Search
USPC ............... 83/13, 157, 651, 111–117, 96, 385, 83/610, 386, 387, 389, 382, 612; 156/353, 156/175, 425, 433, 441, 523, 526, 186, 173, 156/264, 574
See application file for complete search history.

(56) References Cited

U.S. PATENT DOCUMENTS

| | | | |
|---|---|---|---|
| 2,478,165 A | 8/1949 | Collins | |
| 2,973,678 A * | 3/1961 | Scott et al. | 83/96 |
| 3,176,559 A * | 4/1965 | Kootz | 83/157 |
| 3,196,067 A | 7/1965 | Techtmann | |
| 3,267,788 A | 8/1966 | Giordano | |
| 3,356,781 A | 12/1967 | Sulewski et al. | |
| 3,926,081 A | 12/1975 | Roberts | |
| 4,133,712 A | 1/1979 | Geschwender | |
| 4,337,679 A * | 7/1982 | Krylov et al. | 83/385 |
| 4,516,461 A | 5/1985 | Schaeffer | |
| 4,569,716 A | 2/1986 | Pugh | |
| 4,622,091 A | 11/1986 | Letterman | |
| 4,867,834 A | 9/1989 | Alenskis et al. | |
| 4,943,338 A | 7/1990 | Wisbey | |
| 5,045,147 A * | 9/1991 | Benson et al. | 156/429 |
| 5,110,395 A * | 5/1992 | Vaniglia | 156/353 |
| 5,195,413 A | 3/1993 | Johnson | |
| 5,273,602 A * | 12/1993 | Gill et al. | 156/166 |
| 5,281,388 A | 1/1994 | Palmer et al. | |
| 5,290,389 A * | 3/1994 | Shupe et al. | 156/425 |
| 5,322,665 A | 6/1994 | Bernardon et al. | |
| 5,560,942 A | 10/1996 | Curry | |
| 5,698,066 A | 12/1997 | Johnson et al. | |
| 5,954,917 A | 9/1999 | Jackson et al. | |
| 6,035,752 A * | 3/2000 | Harhay et al. | 83/111 |
| 6,482,497 B1 | 11/2002 | Kay et al. | |
| 6,997,363 B1 | 2/2006 | Vossen | |
| 7,472,736 B2 | 1/2009 | Kisch et al. | |

(Continued)

OTHER PUBLICATIONS

Ermert, W. et al "R U Reinforcing plastics with robots?", Plastics Engineering, May 1981, pp. 37-46.

*Primary Examiner* — Ghassem Alie

(57) ABSTRACT

A cutting apparatus to cut a tow includes a tow support, a first blade, and a tow support deflector. The tow support deflector is disposed in cooperative alignment with the first blade to exert a deflecting force upon the tow support. The deflecting force substantially preventing the first blade from striking the tow support.

20 Claims, 5 Drawing Sheets

(56) References Cited

U.S. PATENT DOCUMENTS

| | | |
|---|---|---|
| 2003/0102604 A1 | 6/2003 | Mack et al. |
| 2004/0140587 A1 | 7/2004 | Hadley |
| 2004/0219855 A1 | 11/2004 | Tsotsis |
| 2004/0242836 A1 | 12/2004 | Hayes et al. |
| 2007/0090562 A1 | 4/2007 | Hawkins |
| 2009/0078361 A1 | 3/2009 | Kisch et al. |

* cited by examiner

TOW CUTTING APPARATUS

CROSS-REFERENCE TO RELATED APPLICATIONS

This application claims priority to and is a divisional of U.S. application Ser. No. 11/204,355 entitled TOW CUTTING DEVICE AND SYSTEM, filed on Aug. 16, 2005, the entire contents of which is expressly incorporated by reference in its entirety herein.

FIELD

The present disclosure generally relates to backing materials for sheet and roll stock. More particularly, the present disclosure pertains to an improved backing material for pre-impregnated ply material.

BACKGROUND

Composite items are typically constructed from layers of material that are laminated together. The categories of materials utilized to fabricate or 'layup' composite items includes, for example: fiber; fabric; tape; film; and foil. Within each of these categories, a multitude of diverse materials are utilized. For example, fibers utilized includes: glass; carbon; aramid; quartz; and the like. When these fibers are arranged as woven sheets and unidirectional ribbons, they are referred to as fabric and tape, respectively.

Fiber placement is a process used to construct or fabricate composite items. These composite items include relatively simple planar sheets or panels to relatively large complex structures. The composite items are generally built up from multiple layers or plies of composite materials that are pre-impregnated with uncured resin ("prepreg"). These plies are placed on a form by a head that is positioned by a positioning device such as a robotic arm or gantry.

Composite materials are typically supplied in rolls or spools in a variety of widths. Generally, more highly contoured composite items are fabricated from relatively narrower composite materials. Composite materials having a width of about $\frac{1}{8}^{th}$ inch to about 1 inch are typically referred to as "tow" and often, several strands of tow are placed at once in order to lay down a wider strip or "course." A head on a tow placement device arrays a group of prepreg tows into a continuous band and compacts them against the surface of the form or layup tool. At the end of each course, all of the tows are generally cut and then rethreaded to start the next course. In addition, individual tows are sometimes cut during placement of a course to reduce the overall width, or shape, of the course. A disadvantage of conventional cutter modules in tow placement devices is that the cutters often fail. Cutter failures typically stop production until corrective measures are taken. These stoppages decrease laydown rates and increase product costs.

Another disadvantage of conventional cutter modules is that resin from the prepreg tows may foul the blades and other components of the cutter module. This fouling contributes to cutter failures and typically requires cleaning procedures to be performed. These cleaning procedures generally require the tow placement device to be shut down and may require partial disassembly. Such procedures also decrease laydown rates and increase product costs.

Accordingly, it is desirable to provide an apparatus and system capable of overcoming the disadvantages described herein at least to some extent.

BRIEF SUMMARY

The foregoing needs are met, to a great extent, by the present disclosure, wherein in one respect a device and system is provided that in some embodiments improves the reliability of cutter modules in a tow placement device.

An embodiment of the present disclosure relates to a cutting apparatus to cut a tow. The cutting apparatus includes a tow support, first blade, and tow support deflector. The tow support supports the tow. The first blade cuts the tow. The tow support deflector is disposed in cooperative alignment with the first blade to exert a deflecting force upon the tow support. The deflecting force substantially prevents the first blade from striking the tow support.

Another embodiment of the present disclosure pertains to a tow placement system to fabricate a composite item with a tow. The system includes a tow placement head, positioning device, and cutting apparatus. The tow placement head applies the tow to a tool. The positioning device positions the tow placement head. The cutting apparatus cuts the tow. The cutting apparatus includes a tow support, first blade, and tow support deflector. The tow support supports the tow. The first blade cuts the tow. The tow support deflector is disposed in cooperative alignment with the first blade to exert a deflecting force upon the tow support. The deflecting force substantially prevents the first blade from striking the tow support.

Yet another embodiment of the present disclosure relates to an apparatus to cut tow. The apparatus includes a means for supporting the tow, means for cutting the tow, and means for deflecting the supporting means to substantially prevent the cutting means from striking the supporting means.

Yet another embodiment of the present disclosure pertains to a method of cutting a tow. In this method, the tow is supported on a support, the tow is cut with a blade, and the support is deflected to substantially prevent the blade from striking the support.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

Figure 1:
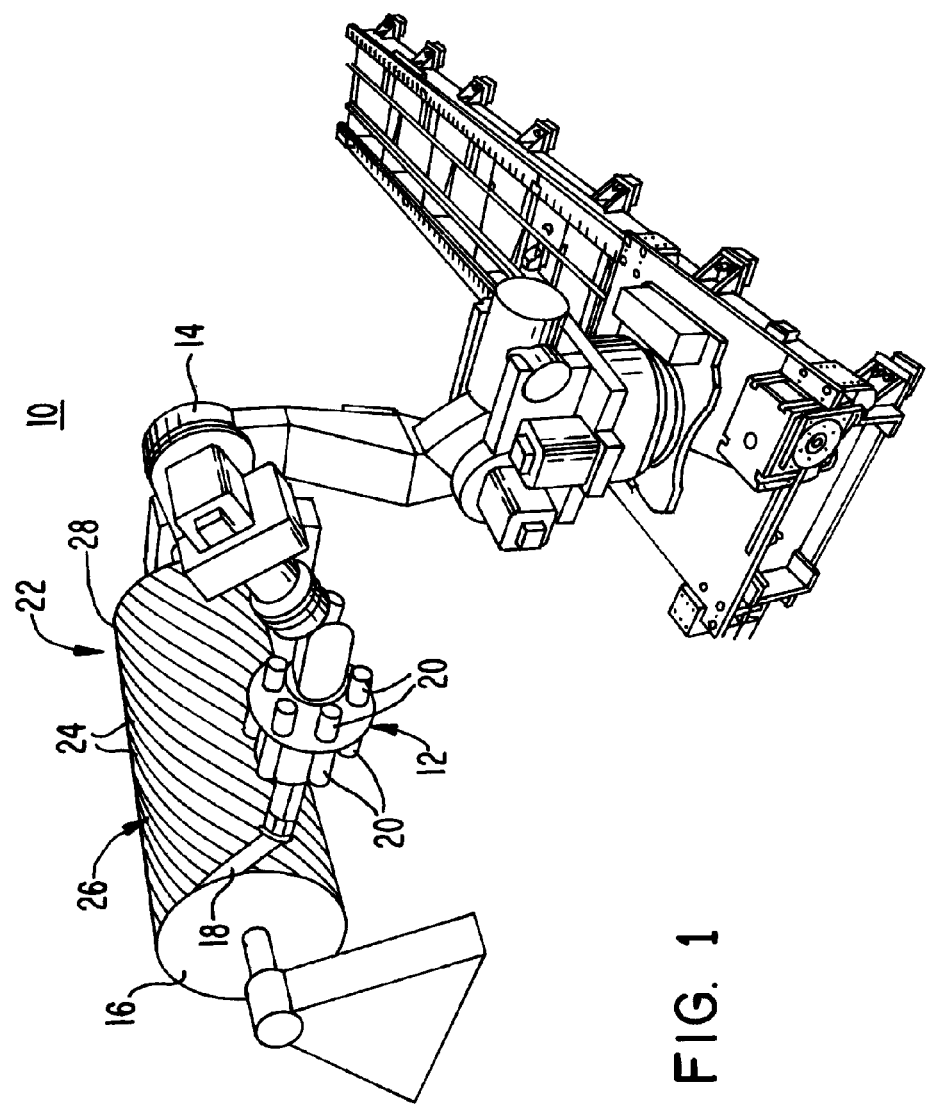
FIG. 1 is a perspective view of a laminating system according to an embodiment of the disclosure.

The disclosure will now be described with reference to the drawing figures, in which like reference numerals refer to like parts throughout. As shown in FIG. 1, a laminating system 10 suitable for use in an embodiment of the disclosure includes a tow placement head 12, positioning device 14, and form 16. The tow placement head 12 is configured to place a predetermined width of a tow 18 on the form 16. The tow 18 is typically stored on and dispensed from one or more spools 20. A composite item 22 is fabricated by placing the tow 18 from the spools 20 onto the form 16 and then performing a curing procedure. The curing procedure is varied according the tow manufacturers' specifications. For example, curing bismaleimide (BMI) resins typically includes subjecting a fabricated composite item to elevated heat and pressure.

The positioning device 14 includes any suitable device to position the tow placement head 12 or end effector relative to the form 16. Suitable positioning devices include a robotic armature as illustrated in FIG. 1, gantry-type devices, and the like. In an embodiment of the disclosure, the positioning device 14 is a robotic armature or gantry-type positioning device configured to control three to ten or more axes of movement. However, it is to be understood that the specific number of axes may depend upon the particular operating condition and thus, the number of axes controlled is not critical to the disclosure.

The form 16 includes any suitable form, tool, or mandrel for placing the tow 18 upon. The tow 18 is placed upon the form 16 in a plurality of courses 24 to generate a layer or ply 26. Generally, items such as the composite item 22 are fabricated from multiple plies 26. Typically, the surface of the form 16, the courses 24 and/or plies 26 are referred to as a substrate 28 upon which subsequent courses of the tow 18 are placed. As shown in FIG. 1, the form 16 is controlled to rotate about an axis. When controlled to rotate thusly, the form 16 is typically referred to as a mandrel. In other embodiments, the form 16 may be stationary or controlled to move in various axes. For example, the form 16 may be secured to a sliding table or X-Y table. In this regard, these and other embodiments in which the form 16 and/or the tow placement head 12 are controlled to move, one relative to the other, are within the scope of the disclosure. Additionally, the movement of the form 16 and the positioning device 14 both act to position the tow placement head 12 relative to the form 16. Furthermore, the movement of the form 16 and the positioning device 14 is generally coordinated to such a degree that the devices operate essentially as a single unit and thus, for the purpose of this disclosure, modulation of the positioning device 14 and/or the form 16 will be referred to with respect to the positioning device 14. Characteristics of the form 16, such as size, shape, contour, and the like, are based upon design parameters of the item 22.

Figure 2:
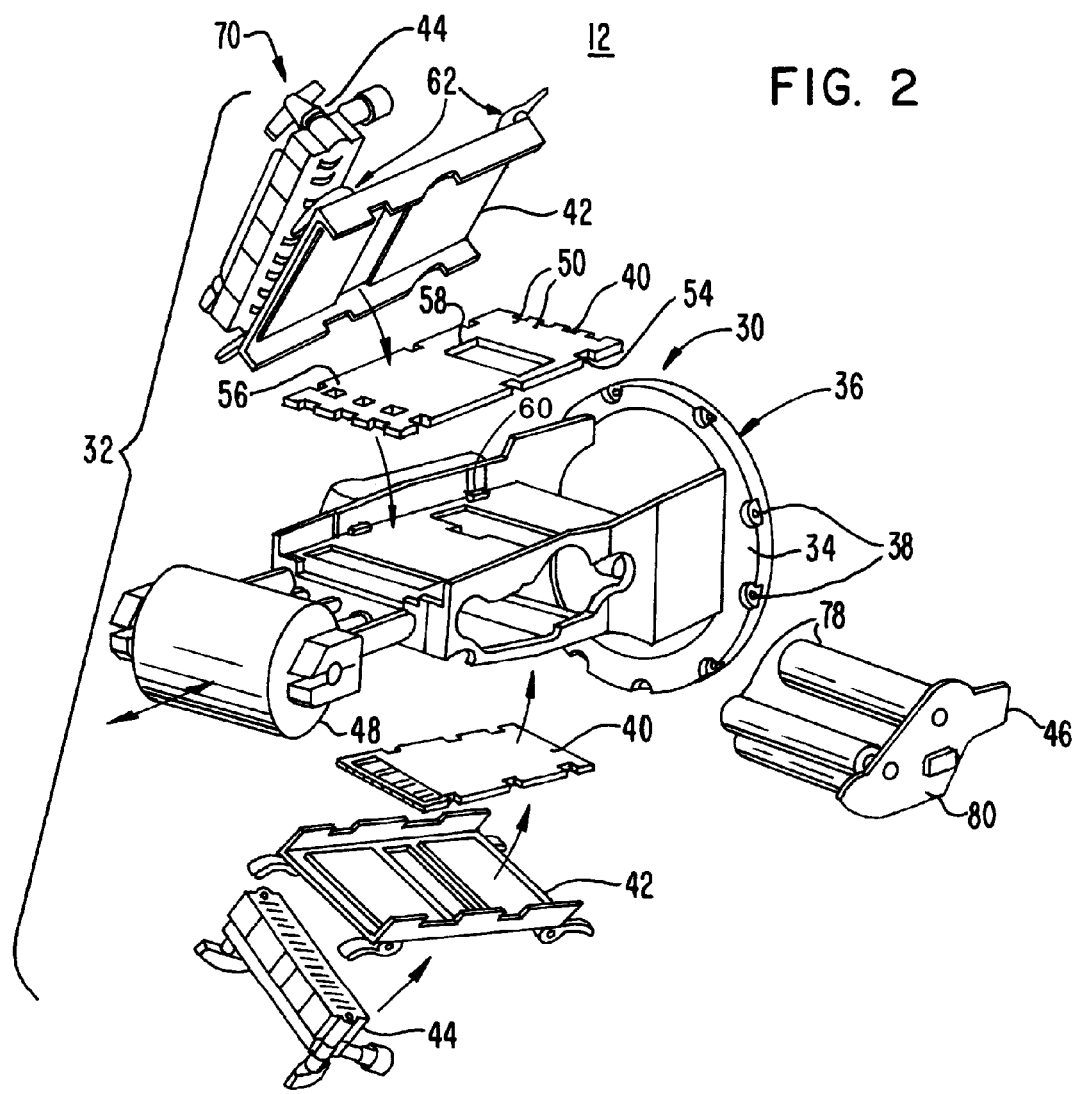
FIG. 2 is an exploded detailed view of the end effector suitable for use with the laminating system of FIG. 1.

FIG. 2 is an exploded detailed view of the tow placement head 12 suitable for use with the laminating system 10 of FIG. 1. As shown in FIG. 2, the tow placement head 12 includes a main frame structure ("frame") 30 and a plurality of components disposed along a tow path 32. The frame 30 is configured to provide support and connection points for the plurality of components disposed along the tow path 32. The tow path 32 basically includes a path from the spools 20, where the tow 18 is stored, to the form 16, where the tow 18 is placed. The plurality of components disposed along the tow path 32 include a pair of tow alignment trays ("trays") 40, a pair of index and key lock frames ("index frames") 42, a pair of tow cutter/rethread modules 44, servo drive feed ("drive") 46, and an application roller ("roller") 48. It is to be noted that while an example is provided in which several components are present in pairs, in various other embodiments, some or all of the components are present as single, paired, or multiple components and all such embodiments are within the scope of the disclosure.

The trays 40 facilitate alignment of the tow 18. For example, each tray 40 includes one or more channels 50 that guide the tow 18 to the roller 48 via the drive 46 and the tow cutter/rethread modules 44. The channels 50 include any suitable structure configured to retain the tow 18 in alignment. Suitable structures include, for example, channels, grooves, slots, combs, and the like. The channels 50 include a surface that is compatible for use with the tow 18. For example, ultra high molecular weight plastic ("UHMW") plastic is generally compatible with BMI and other resin systems. In some embodiments, all or most of the tray 40 is UHMW plastic. In other embodiments, the tray 40 includes a layer or coating of UHMW plastic.

The trays 40 optionally include indexing points 54, drive windows 56 and 58. If present, the indexing points 54 facilitate positioning the trays 40 upon the frame 30. For example, as shown in FIG. 2, the indexing points 54 include notches configured to mate with respective tabs 60. In another example, the indexing points 54 include bores or pins configured to mate with respective pins or bores. The drive windows 56 and 58 are optionally included to provide an opening for the drive 46 to contact the tow 18. In other instances in which, for example, the drive 46 is disposed relatively above the channels 50, the drive window 58 may be omitted. Depending upon the configuration of the tow cutter/rethread modules 44, one or more cutter recesses are provided to facilitate proper operation of the tow cutter/rethread modules 44. That is, if some portion of the tow cutter/rethread modules 44 operate below the surface of the tray 40, the cutter recesses accommodate that the operation of the tow cutter/rethread modules 44. In other instances in which the tow cutter/rethread modules 44 do not operate below the surface of the tray 40, the cutter recesses may be omitted.

The index frames 42 facilitate securing respective ones of the trays 40 to the frame 30. For example, the index frames 42 include one or more fasteners 62.

The tow cutter/rethread modules 44 are described in greater detail herein. In general, the tow cutter/rethread modules 44 cut, clamp, and/or rethread the tow 18. The tow cutter/rethread modules 44 include one or more fasteners 70 to secure the tow cutter/rethread modules 44 to the frame 30 and/or to secure the tow cutter/rethread modules 44 to intervening components.

The drive 46 is configured to engage the tow 18 and urge the tow 18 along the tow path. In this regard, the drive 46 includes one or more servo driven rollers 78. In addition, the drive 46 includes a fastener 80 to secure the drive 46 to the frame 30.

The roller 48 provides a bearing surface to urge the tow 18 toward the form 16 and thereby apply the tow 18 upon the substrate 28.

In addition, the plurality of components disposed along the tow path 32 are configured to function in a coordinated fashion to handle a predetermined width of the tow 18. According to design parameters of the composite item 22, this predetermined width includes $1/8^{th}$ inch, 1/4 inch, 1/2 inch, 1 inch, and the like. Similarly, components configured to handle other width of the tow 18 are within the scope of various embodiments of the disclosure.

Figure 3:
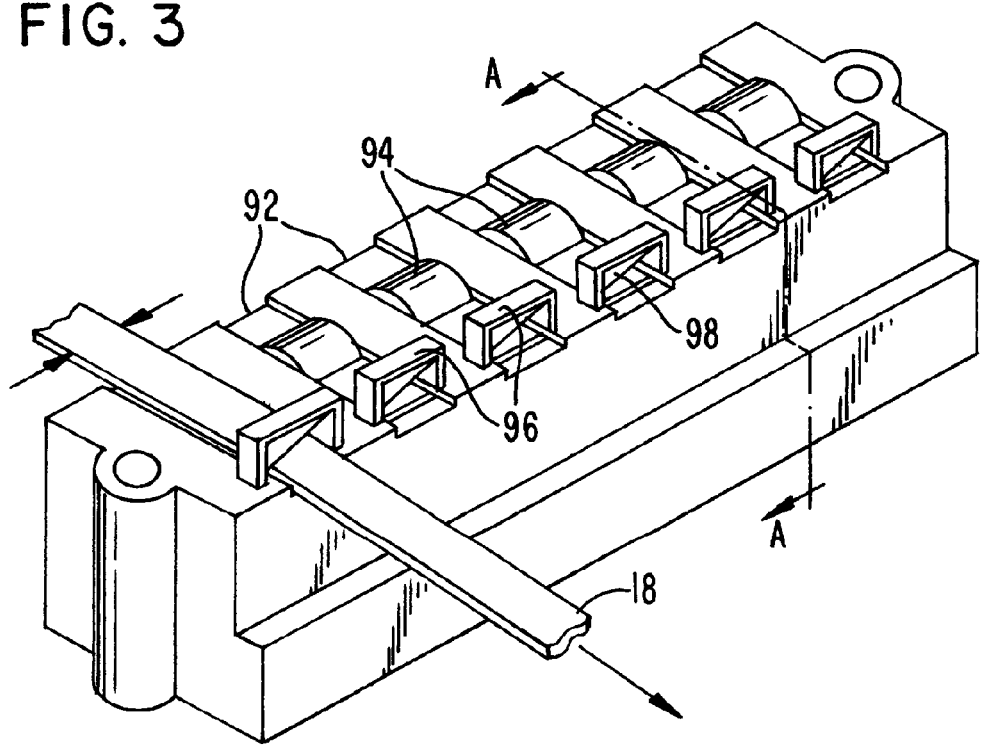
FIG. 3 is a detailed view of a cut/rethread module suitable for use with the laminating system of FIG. 1.

FIG. 3 is a detailed view of a cut/rethread module 44 suitable for use with the laminating system 10 of FIG. 1. As shown in FIG. 3 the cut/rethread module 44 includes a plurality of channels 92, rollers 94, cut/clamp frames 96, and blades 98. In operation, each of the plurality of strips of the tow 18 is threaded along their respective channel 92, past the roller 94, and through the cut/clamp frame 96. The channel 92 facilitates alignment of the tow 18. The roller 94, in various embodiments is free rolling, rolls in one direction only, and/or is controlled to roll via a servo or other such actuator. Each of the cut/clamp frames 96 includes an actuator, as shown and described herein, to urge a respective blade 98 toward the tow cutter/rethread module 44 and thereby cuts the respective tow 18 as the blade 98 passes through the tow 18. The blade 98 includes any suitably hard and wear-resistant material. Suitable materials include metals such as carbide, steel and various alloys of steel, and non-metals such as ceramics and the like.

To rethread, the cut/clamp frame 96 is returned to the extended position and roller 94 and/or the drive 46 is controlled to advance the tow 18. In this manner, some or all of the tows 18 are cut and rethread, in a controlled fashion, according to design parameters of the composite item 22.

It is to be noted that while FIG. 3 illustrates a cut/rethread module 44 configured to operate with 6 or fewer strips of the tow 18, in various embodiments, the cut/rethread module 44 is configured to operate with any suitable number of the tows 18. Suitable numbers of tow include 1, 2, 3, 4, 6, 12, and the like.

Figure 4A:
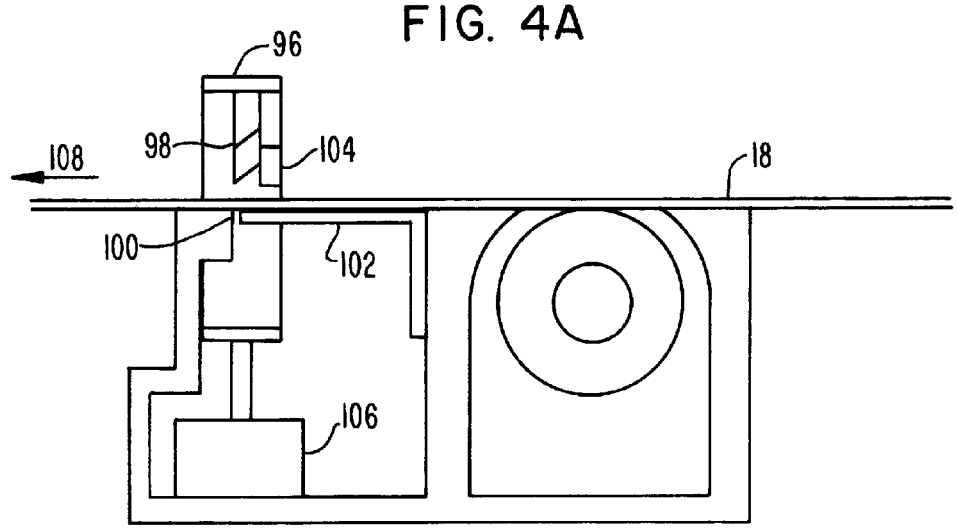
FIG. 4A is a cross sectional view taken through line A-A of FIG. 3 of a cutter configuration in a tow dispensing mode according to the embodiment of FIG. 1.
Figure 4B:
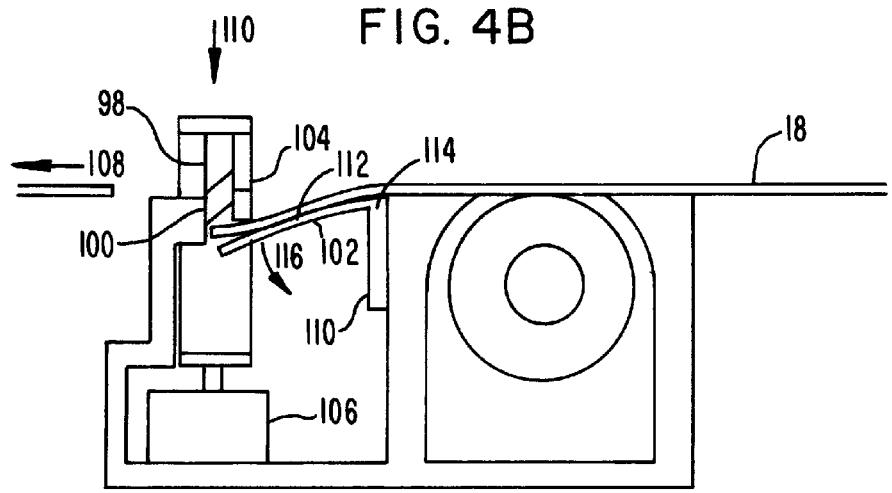
FIG. 4B is a cross sectional view taken through line A-A of FIG. 3 of a cutter configuration in a tow cutting mode according to the embodiment of FIG. 1.
Figure 4C:
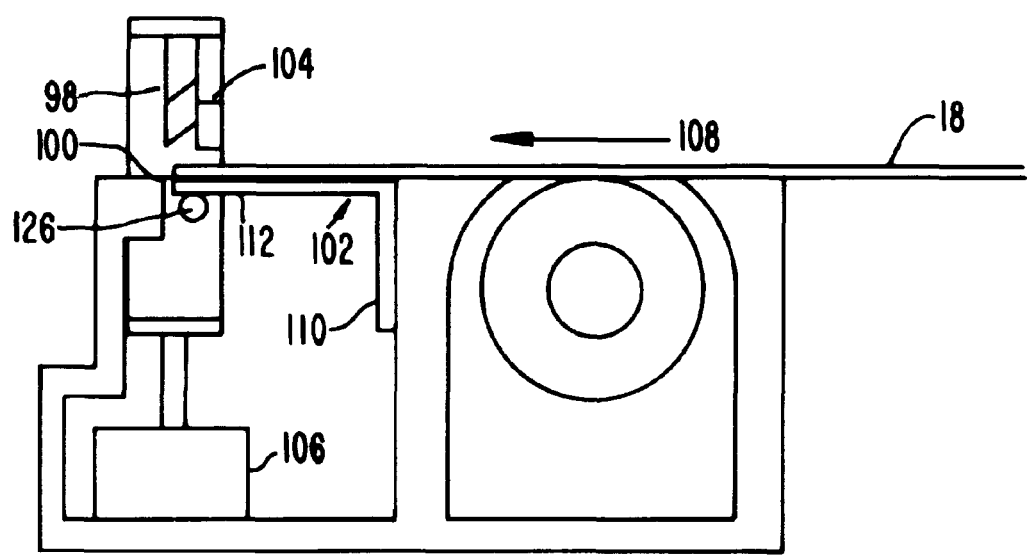
FIG. 4C is a cross sectional view taken through line A-A of FIG. 3 of a cutter configuration in a tow rethreading mode according to the embodiment of FIG. 1.

FIGS. 4A-4C are cross sectional views taken through line A-A of FIG. 3 of a cutter configuration in various modes according to the embodiment of FIG. 1. As shown in FIGS. 4A-4C, in addition to the blade 98, the cut/rethread module 44 optionally includes a blade 100 in co-operative alignment with the blade 98 and configured to assist or facilitate the cutting action of the blade 98. If present, the blade 100 includes a suitably hard and wear-resistant material. Suitable materials include metals such as carbide, steel and various alloys of steel, and non-metals such as ceramics and the like. The cut/rethread module 44 further includes a tow support 102, tow support deflector 104, and actuator 106. The tow support 102 includes a sprung support surface configured to support the tow 18. The tow support 102 is configured to deflect in response to a force being exerted upon it. Suitable materials for the tow support 102 include spring steel, other resilient metals, plastics, and the like. Optionally, any surfaces of the tow support 102 coming in contact with the tow 18 are configured to reduce buildup of resin. For example, the tow support 102 is polished, chilled, and/or coated with a substantially non-stick material. Suitable non-stick materials include UHMW plastic and the like. The actuator 106 is operable to modulate the position of the cut/clamp frame 96 in response to signals from a controller. In particular, the actuator 106 is operable to draw the cut/clamp frame 96 relatively inwardly and return the cut/clamp frame 96 to an outward position.

As shown in FIG. 4A, the cut/rethread module 44 is in a tow dispensing mode. That is, the cut/clamp frame 96 is extended relatively outwardly from the cut/rethread module 44. As such, the tow 18 is free to move in a direction 108.

FIG. 4B is a cross sectional view A-A of a cutter configuration in a tow cutting mode according to the embodiment of FIG. 1. As shown in FIG. 4B, the tow support 102 includes a fastening arm 110 and a support arm 112 that are joined at an intersection 114. In various embodiments, the support arm 112 is flexible or essentially ridged and the intersection 114 is substantially ridged, flexible, or hinged. During the tow cutting procedure, the cut/clamp frame 96 is drawn in a direction 116 and relatively towards the cut/rethread module 44 via the action of the actuator 106. Of note, the tow support deflector 104 is shown to exert a deflecting force upon the tow support 102 and causes the support arm 112 to flex or otherwise move in a direction as the deflecting force is translated through the tow 18. The tow support deflector 104 includes a bearing surface disposed at or about at the level of the blade 98. That is, the tow support deflector 104 is disposed slightly above, at, or slightly below the blade 98. In a particular embodiment, when drawn towards the cut/rethread module 44, the tow support deflector 104 contacts the tow 18 at or just prior to contact by the blade 98. Generally, the tow support deflector is configured to provide a force to urge the tow support arm 112 away from the blade 98. In this manner, the tow support deflector 104 substantially prevents the blade 98 from contacting the tow support arm 112. Optionally, the tow support deflector 104 operates in conjunction with the tow support arm 112 to generate a clamping force upon the tow 18 as described herein.

As the blade 98 is drawn into the tow 18, any movement of the tow 18 in the direction 108 urges the blade 98 in the direction 108. This urging of the blade in the direction 108 generally acts to bring the blade 98 toward the blade 100. It is an advantage of embodiments of the disclosure that as the blade 98 passes by the blade 100, the close proximity of the blade 98 to the blade 100 and the urging of the two blades 98 and 100 together provides an efficient shearing action that improves cutting and/or reduces buildup of resin on the blades 98 and 100. Upon completion of the cutting procedure, a portion of the tow 18 that is downstream of the blade 98 is free to continue moving in direction 108 while a portion of the tow 18 that is upstream of the tow 18 is essentially stopped until rethreading procedures are initiated.

The tow 18 is typically pulled or towed from the spool 20 and through the tow path 32 via the adhesion of the tow 18 to the substrate 28 combined with the movement of the tow placement head 12 relative to the form 16. Therefore, when the downstream portion of the tow 18 is severed from the upstream portion of the tow 18, the upstream portion of the tow 18 is controlled to stop via the action of a tow break and/or tends to stop of its own accord. In an embodiment, the tow support deflector 104 is configured to directly urge the tow support 102. In this embodiment, essentially no clamping force is exerted upon the tow 18 via the action of the tow support deflector 104 urging the tow support 102. For example, the tow support deflector 104 and the tow support 102 may be wider than the tow 18. In this example, the edges of the tow support deflector 104 and the tow support 102 may directly contact one another. More specifically, one or both of the tow support deflector 104 and the tow support 102 may include a protruding portion that facilitates direct contact between the tow support deflector 104 and the tow support 102 without exerting a force upon the tow 18. In another embodiment, the force exerted by the tow support deflector 104 further provides a clamping action upon the tow 18 disposed between the tow deflector 104 and the tow support 102. That is, the tow support deflector 104 urges the tow 18 into the tow support 102 and thereby deflects the tow support 102. This clamping action facilitates retention of the tow 18 within the respective channel 92 as shown in FIG. 3.

FIG. 4C is a cross sectional view A-A of a cutter configuration in a tow rethreading mode according to the embodiment of FIG. 1. As shown in FIG. 4C, the cut/clamp frame 96 has been returned to the tow dispensing mode position as described in FIG. 4A. In response to an absence of deflective forces exerted by the tow support deflector 104, the support arm 112 has returned to a tow dispensing position. That is, the support arm 112 has returned to a level essentially in line with or very slightly above the blade 100. As such, in response to being urged forward by the drive 46, the cut end of the tow 18 is disposed to progress over the blade 100 substantially without catching thereupon. It is an advantage of various embodiments that the tow support deflector 104, being level with or just below the level of the blade 98 inhibits contact of the blade 98 by the tow 18 during rethreading and dispensing modes. In addition, the tow deflector 104 further facilitates rethreading by inhibiting an upward movement of the tow 18 that could result in a rethreading error.

Optionally, the cut/clamp frame 96 includes a lifting pin 120 that traverses the cut/clamp frame 96 and provides a force to urge the support arm 112 into the tow rethreading and dispensing position.

The many features and advantages of the disclosure are apparent from the detailed specification, and thus, it is intended by the appended claims to cover all such features and advantages of the disclosure that fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A cutting apparatus to cut a tow, comprising:
    a tow support;
    a first blade;
    a tow support deflector located upstream of the first blade with respect to a direction of movement of the tow and being disposed in cooperative alignment with the first blade to exert a deflecting force upon the tow support, the deflecting force substantially preventing the first blade from striking the tow support;
    the tow support deflector being configured to deflect the tow support by contacting a top surface of the tow without contacting the support prior to the first blade contacting the tow;
    the first blade including a free end having a different configuration than a free end of the tow support deflector; and
    the tow support deflector and the first blade being separate components having substantially vertical surfaces in direct contact with one another along a length of the vertical surfaces and being attached together and moving together, the tow support deflector extending further downwardly than the first blade.

2. The cutting apparatus according to claim 1, further comprising:
    a second blade oriented in cooperative alignment with the first blade and generating a shearing force upon the tow to cut the tow.

3. The cutting apparatus according to claim 2, wherein:
    the second blade is located downstream of the first blade along a direction of movement of the tow; and
    the movement of the tow generating a force urging the first blade toward the second blade.

4. The cutting apparatus according to claim 1, further comprising:
    an actuator urging the first blade toward the tow in response to a cut command.

5. The cutting apparatus according to claim 4, further comprising:
    a cut/clamp frame;
    the first blade and the tow support deflector being disposed upon the cut/clamp frame; and
    the actuator causing movement of the first blade and the tow support deflector by urging the cut/clamp frame.

6. The cutting apparatus according to claim 5, wherein the actuator is configured to return the cut/clamp frame to a dispensing position in response to a rethread command.

7. The cutting apparatus according to claim 1, wherein the tow support comprises a spring to return the tow to a rethreading position in response to the deflecting force being removed.

8. The cutting apparatus according to claim 1, wherein the tow support deflector is configured to exert the deflecting force upon the tow and the deflecting force is translated via the tow to the tow support.

9. The cutting apparatus according to claim 1, wherein a tow clamping force to hold the tow in position is generated by movement of the tow support deflector relative to the tow support.

10. The cutting apparatus according to claim 1, further comprising:
    a feed drive to rethread the tow by urging the tow in a forward direction.

11. A tow placement system for fabricating a composite item, comprising:
    a tow placement head to apply a tow to a tool;
    a positioning device to position the tow placement head; and
    a cutting apparatus to cut the tow, including:
        a tow support;
        a first blade;
        a tow support deflector located upstream of the first blade with respect to a direction of movement of the tow and being disposed in cooperative alignment with the first blade to exert a deflecting force upon the tow support, the deflecting force substantially preventing the first blade from striking the tow support;
        the tow support deflector being configured to deflect the tow support by contacting a top surface of the tow without contacting the support prior to the first blade contacting the tow;
        the first blade including a free end having a different configuration than a free end of the tow support deflector; and
        the tow support deflector and the first blade being separate components having substantially vertical surfaces in direct contact with one another along a length of the vertical surfaces and being attached together and moving together, the tow support deflector extending further downwardly than the first blade.

12. The tow placement system according to claim 11, further comprising:
    a second blade oriented in cooperative alignment with the first blade and generating a shearing force upon the tow to cut the tow.

13. The tow placement system according to claim 12, wherein:
the second blade is located downstream of the first blade along a direction of movement of the tow; and
the movement of the tow generating a force urging the first blade toward the second blade.

14. The tow placement system according to claim 11, further comprising:
an actuator urging the first blade toward the tow in response to a cut command.

15. The tow placement system according to claim 14, further comprising:
a cut/clamp frame, wherein the first blade and the tow support deflector are disposed upon the cut/clamp frame and the actuator is configured to urge the first blade and the tow support deflector by urging the cut/clamp frame.

16. The tow placement system according to claim 15, wherein the actuator is configured to return the cut/clamp frame to a dispensing position in response to a rethread command.

17. The tow placement system according to claim 11, wherein the tow support comprises a spring to return the tow to a rethreading position in response to the deflecting force being removed.

18. The tow placement system according to claim 11, wherein the tow support deflector is configured to exert the deflecting force upon the tow and the deflecting force is translated via the tow to the tow support.

19. The tow placement system according to claim 11, wherein a tow clamping force to hold the tow in position is generated by movement of the tow support deflector relative to the tow support.

20. The tow placement system according to claim 11, further comprising:
a feed drive to rethread the tow by urging the tow in a forward direction.

* * * * *